(12) United States Patent
Conner

(10) Patent No.: US 6,742,737 B1
(45) Date of Patent: Jun. 1, 2004

(54) FISHING LINE FEEDER SPOOL SUPPORT

(76) Inventor: Jeffrey R. Conner, 4200 Smokey Row, Ionia, MI (US) 48846

( * ) Notice: Subject to any disclaimer, the term of this patent is extended or adjusted under 35 U.S.C. 154(b) by 0 days.

(21) Appl. No.: 10/249,963

(22) Filed: May 22, 2003

Related U.S. Application Data

(60) Provisional application No. 60/320,060, filed on Mar. 27, 2003.

(51) Int. Cl.7 ...................... A01K 89/00; A01K 89/015; A01K 89/01
(52) U.S. Cl. ................. 242/323; 242/404.2; 242/129.7; 43/25
(58) Field of Search .............................. 242/323, 423.1, 242/404.2, 404.3, 129.7, 129.72; 43/25, 4

(56) References Cited

U.S. PATENT DOCUMENTS

| 3,026,059 | A | * | 3/1962 | Dennier | 242/593 |
| 3,776,485 | A | * | 12/1973 | Foley et al. | 242/571.5 |
| 3,951,354 | A | * | 4/1976 | Bagby | 242/129.8 |
| 3,973,741 | A | * | 8/1976 | Dean | 242/404.2 |
| 4,034,930 | A | * | 7/1977 | Stevenson | 242/422.4 |
| 4,360,172 | A | * | 11/1982 | Cope | 242/592 |
| 5,029,409 | A | * | 7/1991 | Nouwens | 43/25 |
| 5,218,779 | A | * | 6/1993 | Morgan et al. | 43/25 |
| 5,375,788 | A | * | 12/1994 | English | 242/129.8 |
| 5,513,463 | A | * | 5/1996 | Drinkwater | 43/25 |
| 5,544,839 | A | * | 8/1996 | Burch | 242/396.6 |
| 5,839,687 | A | * | 11/1998 | Magnafici | 242/404.3 |
| 6,609,673 | B1 | * | 8/2003 | Johnson | 242/423.1 |

* cited by examiner

Primary Examiner—Emmanuel M Marcelo
(74) Attorney, Agent, or Firm—McGarry Bair PC

(57) ABSTRACT

A fishing line feeder spool support comprises a pair of flexible arms which are adapted to grip a fishing rod ahead of a fishing reel mounted thereon. The feeder spool support comprises a threaded shaft which rotatably supports a spool of fishing line while the fishing line is installed onto the fishing reel through the operation of the reel crank. A flanged nut is threaded onto the shaft to hold the spool. The line tension can be adjusted by tightening the flanged nut against the spool, thereby adjusting the pulling force needed to remove line from the supply spool. A crankable supply spool can also be installed on the shaft to remove and store fishing line from the fishing reel for later replacement on the reel.

26 Claims, 9 Drawing Sheets

FISHING LINE FEEDER SPOOL SUPPORT

CROSS REFERENCE TO RELATED APPLICATIONS

This application claims the benefit of U.S. provisional application Serial No. 60/320,060, filed Mar. 27, 2003, which is incorporated herein in its entirety.

BACKGROUND OF INVENTION

1. Field of the Invention

The invention relates generally to fishing reels and more particularly to a removable spool support for supporting a spool of fishing line in the proper position during installation of the fishing line on a fishing reel.

2. Description of the Related Art

Fishing line used in sportfishing is available in a wide range of materials, sizes, and performance properties. Selection of the appropriate fishing line will depend upon several factors such as the type of fishing (bait fishing, flyfishing, spin casting), the type of water (freshwater v. salt water, stream fishing v. lake fishing v. ice fishing), the size of the fish pursued, etc. A sportsman active in several different types of fishing may need to use a variety of fishing lines which are readily exchangeable. A selection of fishing lines can be provided in several ways.

Several different replaceable reel spools for each fishing reel, each holding a selected fishing line, can be used. When a particular line is to be used, the reel spool holding that line is exchanged for the reel spool currently on the reel. Alternatively, the fishing line on a particular reel spool can be removed and replaced With the desired line.

In the first instance, maintaining a supply of reel spools can be expensive. In the latter instance, changing line, particularly if it must be done frequently, can be time-consuming and inconvenient. In particular, fishing line must be carefully wound from the supply spool onto the reel spool in order to avoid twisting the line or excessively stretching the line, which can lead to line entanglement during use or premature line failure. Furthermore, all fishing line deteriorates with age and use, and must be periodically replaced with fresh line.

Typically, a sportsman needing to have new fishing line installed on a fishing reel must arrange for a sporting goods store having the proper equipment to install the line. This can be inconvenient, as well as costly. Furthermore, such an option is unworkable if the line must be replaced in the field.

SUMMARY OF INVENTION

A device for installing a length of fishing line onto a fishing reel mounted onto a fishing rod having a longitudinal axis comprises a spool holder adapted to receive a spool containing the length of fishing line, wherein the spool is mounted for rotatable movement with respect to the spool holder, a quick-release clamp, wherein the quick-release clamp has a retainer mounted thereto for movement between a clamping position wherein the retainer is adapted to retain a portion of the fishing rod and a release position wherein the retainer is opened to allow removal of the clamp from the portion of the fishing rod, and a support arm connecting the spool holder to the quick-release clamp, whereby, when a user of the fishing rod desires to install the length of fishing line onto the fishing reel, the quick-release clamp, in its release position, is positioned over a length of the fishing rod generally distal from the fishing reel, and the quick-release clamp is moved to its clamping position so that the quick-release clamp is retained on the rod whereby a spool of additional fishing line can be rotatably mounted on the spool holder and the fishing line from the spool can be fed onto the fishing reel in a convenient manner. In one embodiment, a spring biases the quick-release clamp to the clamping position. In another embodiment, a spool retainer retains the spool on the spool holder. In yet another embodiment, the spool retainer is a flanged nut. The flanged nut can be tightened against the spool to restrain the spool against rotating. A spring can be inserted between the spool retainer and the spool.

In another embodiment, the support arm is inclined relative to the spool holder. In yet another embodiment the support arm comprises a lower linkage, an upper linkage, and a pivotal connection therebetween for pivotal movement of the upper linkage relative to the lower linkage. In another embodiment, the quick-release clamp, the spool holder, and the support arm lie in a plane orthogonal to the longitudinal axis of the fishing rod. In another embodiment, the spool further comprises a crank for rotating the spool to retrieve line from the reel onto the spool.

In another embodiment, an assembly for installing fishing line onto a fishing reel comprises a fishing rod having a longitudinal axis, a fishing reel mounted to the fishing rod at a first end thereof, at least one eyelet adapted to route the fishing line along the length of the rod, and a line feeding device comprising a spool holder adapted to receive a spool containing the length of fishing line, wherein the spool is mounted for rotatable movement with respect to the spool holder, a quick-release clamp, wherein the quick-release clamp has a retainer mounted thereto for movement between a clamping position wherein the retainer is adapted to retain a portion of the fishing rod and a release position wherein the retainer is opened to allow removal of the clamp from the portion of the fishing rod, and a support arm connecting the spool holder to the quick-release clamp, whereby, when a user of the fishing rod desires to install the length of fishing line onto the fishing reel, the quick-release clamp, in its release position, is positioned over a length of the fishing rod generally distal from the fishing reel, and the quick-release clamp is moved to its clamping position so that the quick-release clamp is retained on the rod whereby a spool of additional fishing line can be rotatably mounted on the spool holder and the fishing line from the spool can be fed onto the fishing reel in a convenient manner.

In another embodiment, a method of installing fishing line from a spool of replacement fishing line onto a fishing reel mounted to a fishing rod comprises the steps of detachably mounting the spool of replacement fishing line to the fishing rod for rotatable movement of the spool with respect thereto in a generally spaced relationship with respect to the fishing reel, threading the fishing line from the spool of replacement fishing line to the fishing reel, attaching the fishing line to the fishing reel, and winding the fishing line onto the fishing reel. In another embodiment, the method can comprise the step of restraining rotation of the spool of replacement fishing line to vary the tension of the fishing line being wound onto the fishing reel. In yet another embodiment, the method can comprise the step of rotating the spool to unwind fishing line from the fishing reel onto the spool.

DETAILED DESCRIPTION

Figure 1:
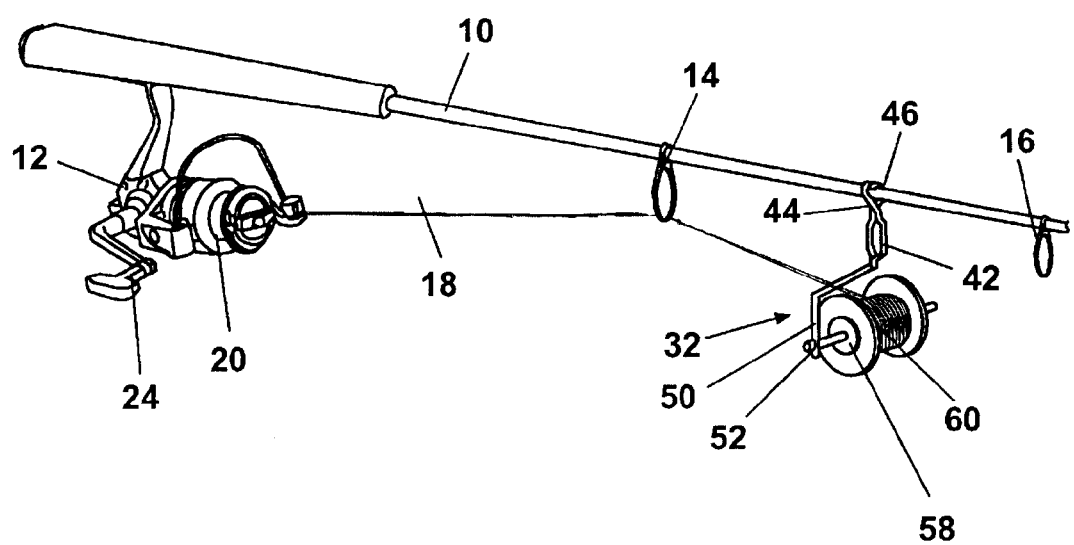
FIG. 1 is a perspective view of a fishing rod and fishing reel having an attached fishing line feeder spool support according to the invention for installing fishing line on the fishing reel.

Referring to the figures, and to FIG. 1 in particular, a well-known fishing rod 10 is shown mounting a fishing reel 12, shown in FIG. 1 as a conventional spinning reel, in a well-known manner. The fishing reel 12 comprises a reel spool 20 and a bail 22 operated by a crank 24 for playing out and retrieving fishing line 18. The fishing line 18 is threaded through a first line guide 14 followed by a plurality of line guides 16 mounted in a conventional manner along the rod 10. It will be understood that, although the fishing reel 12 is shown for exemplary purposes as a spinning reel, the invention is not so limited and can be used with any fishing reel, such as a fly reel or a baitcasting reel.

A fishing line feeder spool support 30 is shown in FIG. 1 attached to the rod 10 as hereinafter described between the first line guide 14 and an adjacent line guide in the plurality of line guides 16, and holding a spool 60 containing a supply of fishing line to be installed on the reel spool 20. FIG. 1 shows the fishing line feeder spool support 30 suspended from the rod 10 to hang from the rod 10 for operable juxtaposition with the reel 12. However, the fishing line feeder spool support 30 can alternatively be attached to the rod 10 to extend upwardly for operable juxtaposition with a fishing reel that is mounted to an upper side of the rod, such as a bait-casting reel.

Figure 2:
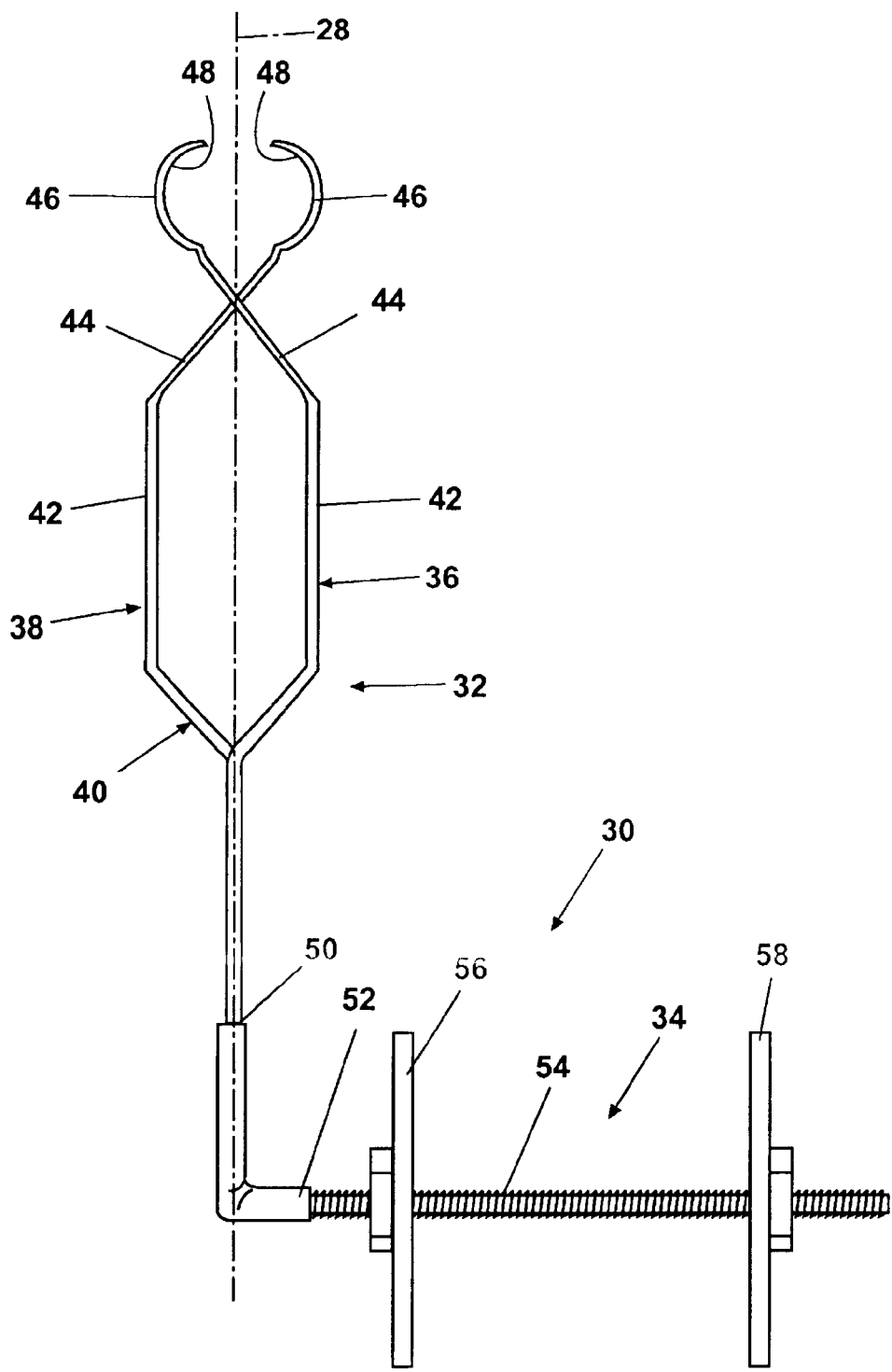
FIG. 2 is a front elevational view of a first embodiment of the fishing line feeder spool support of FIG. 1.

FIG. 2 shows a first embodiment of the fishing line feeder spool support 30 as a generally L-shaped member comprising a quick-release clamp 32 and a spool holder 34. The quick-release clamp 32 comprises a first arm 36 and a second arm 38 joined at a bight section 40, and defines a longitudinal axis 28. In the preferred embodiment, the first arm 36 comprises a generally elongated strap-like member comprising a straight section 42 transitioning to a crossing section 44 inclined therefrom to cross the longitudinal axis 28, and terminating in an arcuate retainer 46. The retainer 46 has a radius of curvature adapted for cooperative register of the retainer 46 with the shaft of the fishing rod 10.

Figure 2A:
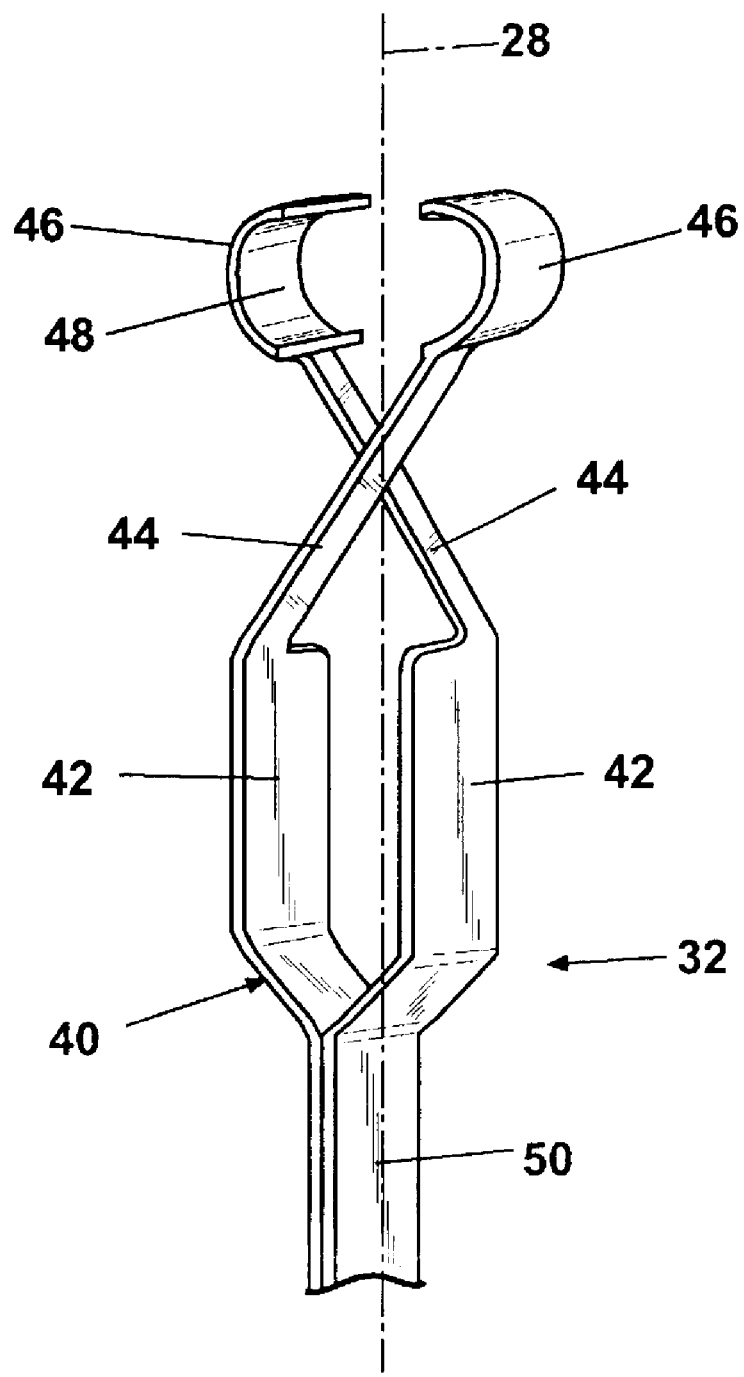
FIG. 2A is a partial perspective view of a portion of the fishing line feeder spool support of FIG. 2.

The crossing section 44 has a somewhat narrower cross-section than the straight section 42 (FIG. 2A). The arcuate retainer 46 has an inner surface 48 which is adapted to frictionally communicate with the shaft of the fishing rod 10, and can be provided with a material, such as rubber, that will not mar the shaft of the fishing rod 10 and will enhance the frictional force between the retainer 46 and the shaft of the fishing rod 10.

The second arm 38 comprises a generally elongated strap-like member generally identical to the first arm 36 and comprising a straight section 42 transitioning to a crossing section 44 inclined therefrom to cross the longitudinal axis 28 in opposed juxtaposition to the first arm 36. The second arm 38 terminates in an arcuate retainer 46 having a radius of curvature adapted for cooperative register of the retainer 46 with the shaft of the fishing rod in opposed juxtaposition to the arcuate retainer 46 of the first arm 36. The crossing section 44 of the second arm 38 also has a somewhat narrower cross-section than the straight section 42. The arcuate retainer 46 of the second arm 38 has an inner surface 48 which is adapted to frictionally communicate with the shaft of the fishing rod 10, and can be provided with a material, such as rubber, that will not mar the shaft of the fishing rod 10 and will enhance the frictional force between the retainer 46 and the shaft of the fishing rod 10. The first arm 36 and the second arm 38 are operably joined at the bight section 40 so that the arcuate retainers 46 are in cooperative juxtaposition as shown in FIG. 2 to form an attachment portion for attaching the fishing line feeder spool support 30 to the shaft of the fishing rod 10. The crossing sections 44 of the first arm 36 and the second arm 38 are adapted so that the crossing sections 44 will clear each other at the point of crossing due to the reduced cross-section of the crossing sections 44, as shown in FIG. 2A.

Figure 5:
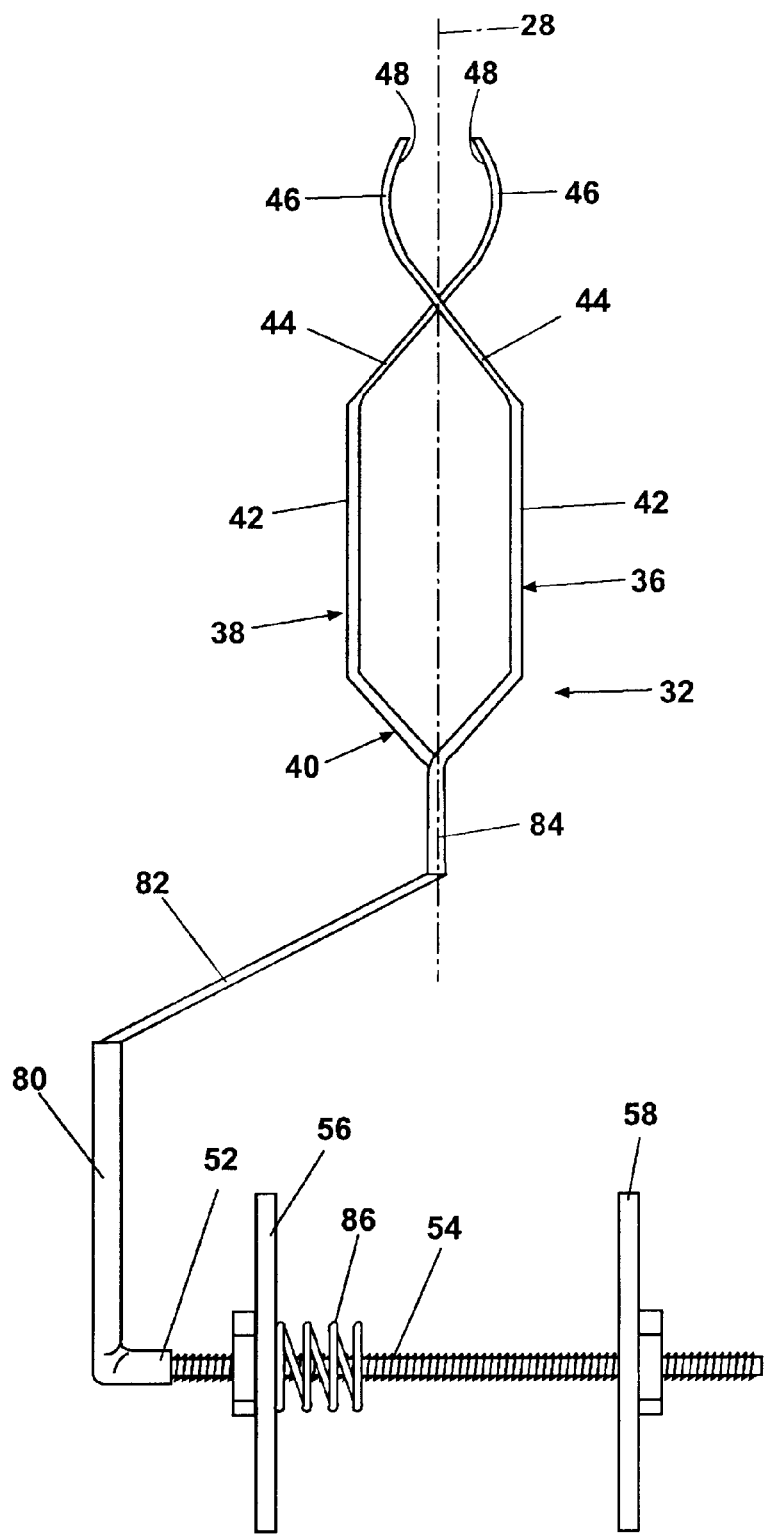
FIG. 5 is a front elevational view of a third embodiment of the fishing line feeder spool support of FIG. 1.

Extending away from the retainers 46 generally collinearly with the longitudinal axis 28 of the quick-release clamp 32 is an elongated support arm 50 which is rigidly attached to the bight section 40 generally parallel to the straight sections 42. An elongated, rod-like spool shaft 52 is rigidly attached to the support arm 50 orthogonal thereto comprising a threaded section 54 adapted for threadable communication with an inner flanged nut 56 and an outer flanged nut 58. The spool shaft 52 is adapted to receive the spool 60 of fishing line which rotates about the spool shaft 52 as line is removed from the spool 60. The flanged nuts 56, 58 can be turned on the threaded section 54 to hold the spool 60 in a selected position on the spool shaft 52. The flanged nuts 56, 58 can also be selectively tightened against the spool 60 to control its rotation and maintain a selected tension on the fishing line during installation of the fishing line on the reel 12. As shown in FIG. 5, a spool spring 86, preferably comprising a conventional helical spring, can be inserted over the spool shaft 52 to bear against one of the inner flanged nuts 56, 58 and the spool 60 containing the fishing line. The flanged 56, 58 can be selectively tightened against the spool 60 to compress the spring 86 and thereby control the rotation of the spool 60 and the tension on the fishing line during installation.

Preferably, the first arm 36, the second arm 38, and the bight section 40 are fabricated from a single piece of material and stamped or bent to the desired configuration. Alternatively, the arms 36, 38 can be fabricated of separate pieces, each comprising half of the bight section 40, and joined together at or below the bight section 40 along the support arm 50, such as by spot welding or suitable fasteners, to form the quick-release clamp 32. Preferably, the quick-release clamp 32 is fabricated of a stiff, resilient material, such as spring steel or a high strength plastic, which can be repeatedly deflected laterally and will return to its original configuration, so that inward pressure on the straight sections 42 will result in separation of the retainers 46, and release of the pressure will result in the return of the arms 36, 38 to their at-rest configuration to impart a clamping force to the section of rod 10 inserted therebetween.

Figure 3:
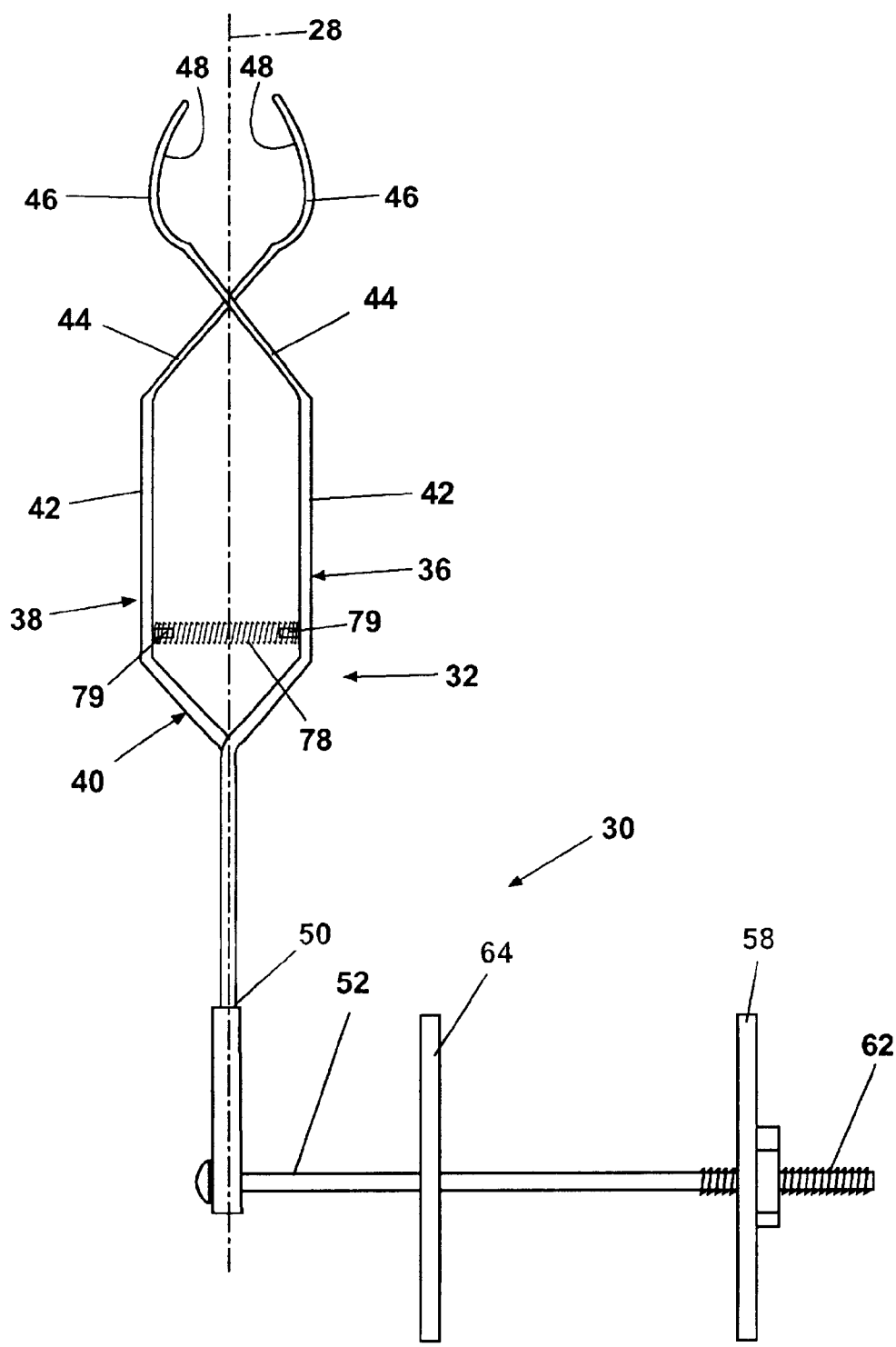
FIG. 3 is a front elevational view of a second embodiment of the fishing line feeder spool support of FIG. 1.

FIG. 3 illustrates a second embodiment of the feeder spool support 30 in which the crossing sections 44 have a somewhat arcuate shape transitioning smoothly into the retainers 46. Additionally, the inner flanged nut 56 is replaced with a spool stop 64. The spool stop 64 is a generally circular platelike flange rigidly attached to the spool shaft 52 and against which the spool bears. The outer flanged nut 56 can be threadably tightened on the threaded section 62 against the spool 60 to maintain a selected tension on the fishing line during installation of the fishing line on the reel 12.

FIG. 3 also illustrates an alternate assembly for developing the clamping force of the retainers 46. A spring 78 is inserted between the first arm 36 and the second arm 38 to provide a clamping force additional to the force resulting from the resiliency of the arms 36, 38. The spring 78 is retained in a preselected position between the arms 36, 38 through a suitable retainer, such as a pair of inwardly-extending retainer posts 79 rigidly attached to the arms 36, 38 over which the ends of the spring 78 can be inserted. It will be understood that the spool stop 64 and the spring 78 can be incorporated into any of the other embodiments shown and described herein.

FIG. 5 shows a third embodiment of the feeder spool support 30 in which the support arm 50 is replaced with a first support arm 80 rigidly attached to the spool shaft 52 orthogonally thereto, an inclined arm 82 rigidly attached to the support arm 50 and inclined away from the spool shaft 52, and a second support arm 84 rigidly attached to the inclined arm 82 parallel to the first support arm 80 so that the quick-release clamp 32 is centered over the spool holder 34, thereby balancing the spool holder 34 beneath the fishing rod 10 in line with the fishing reel 12.

Figure 4A:
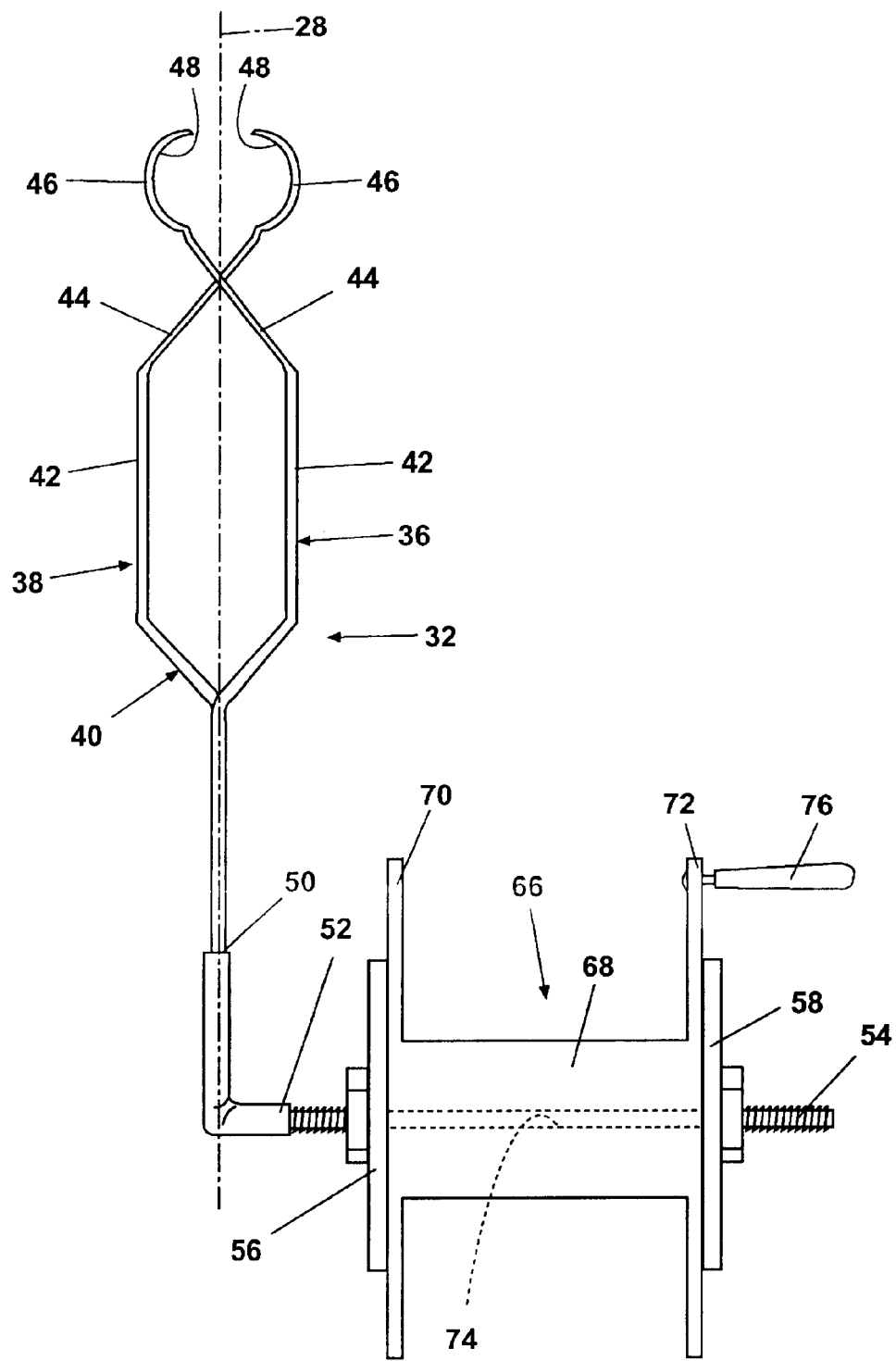
FIG. 4A is a front elevational view of the fishing line feeder spool support of FIG. 2 with a line storage spool for removing and storing fishing line from the fishing reel.
Figure 4B:
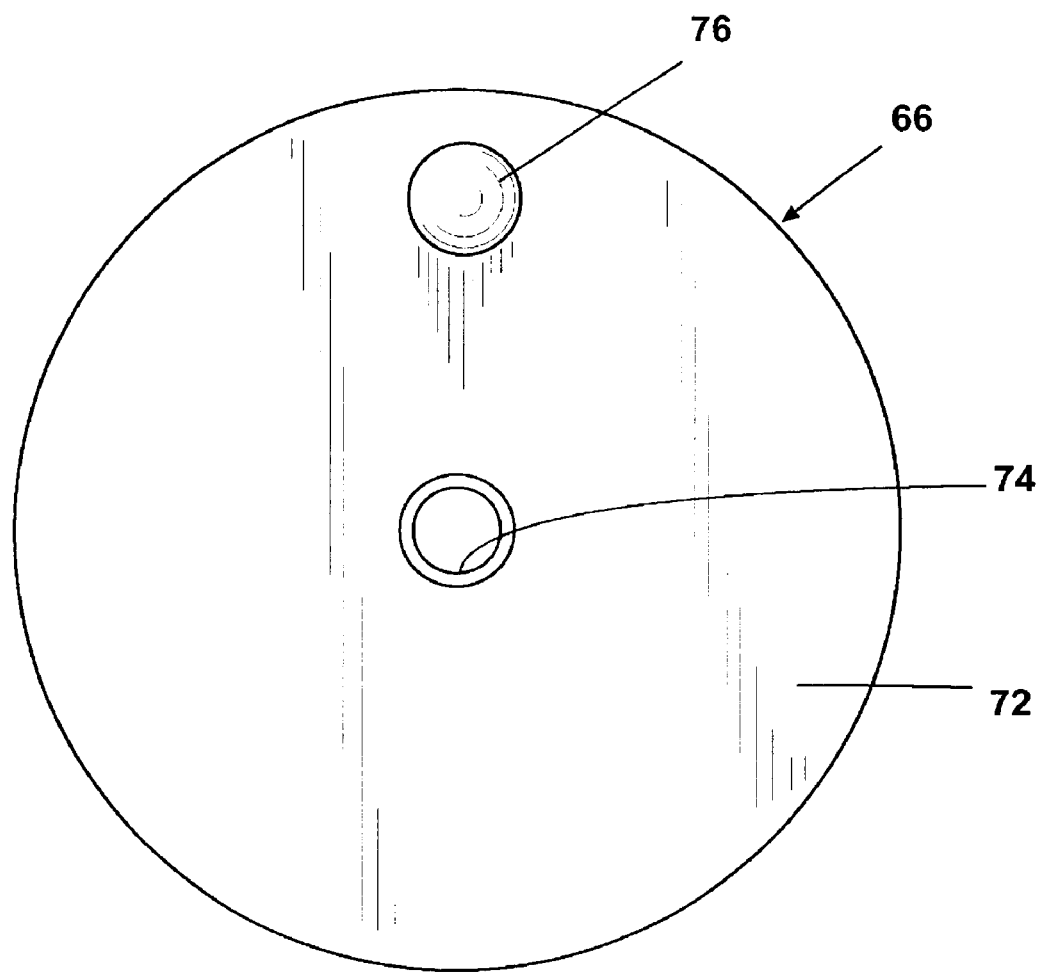
FIG. 4B is a side elevational view of the line storage spool of FIG. 4A.

FIG. 4A shows an embodiment of the feeder spool support 30 provided with a line storage spool 66 comprising a center hub 68, a circular plate-like inner flange 70 and a circular plate-like outer flange 72 coaxially attached to the hub 68 in parallel spaced-apart juxtaposition, an aperture 74 extending through the flanges 70, 72 and the hub 68, and a crank handle 76 rotatably attached to the outer flange 72 adjacent the circumference thereof. The storage spool 66 is adapted to be rotatably received over the support arm 50 and to be turned via the crank handle 76 for removing and storing fishing line from the fishing reel 12.

Figure 6:
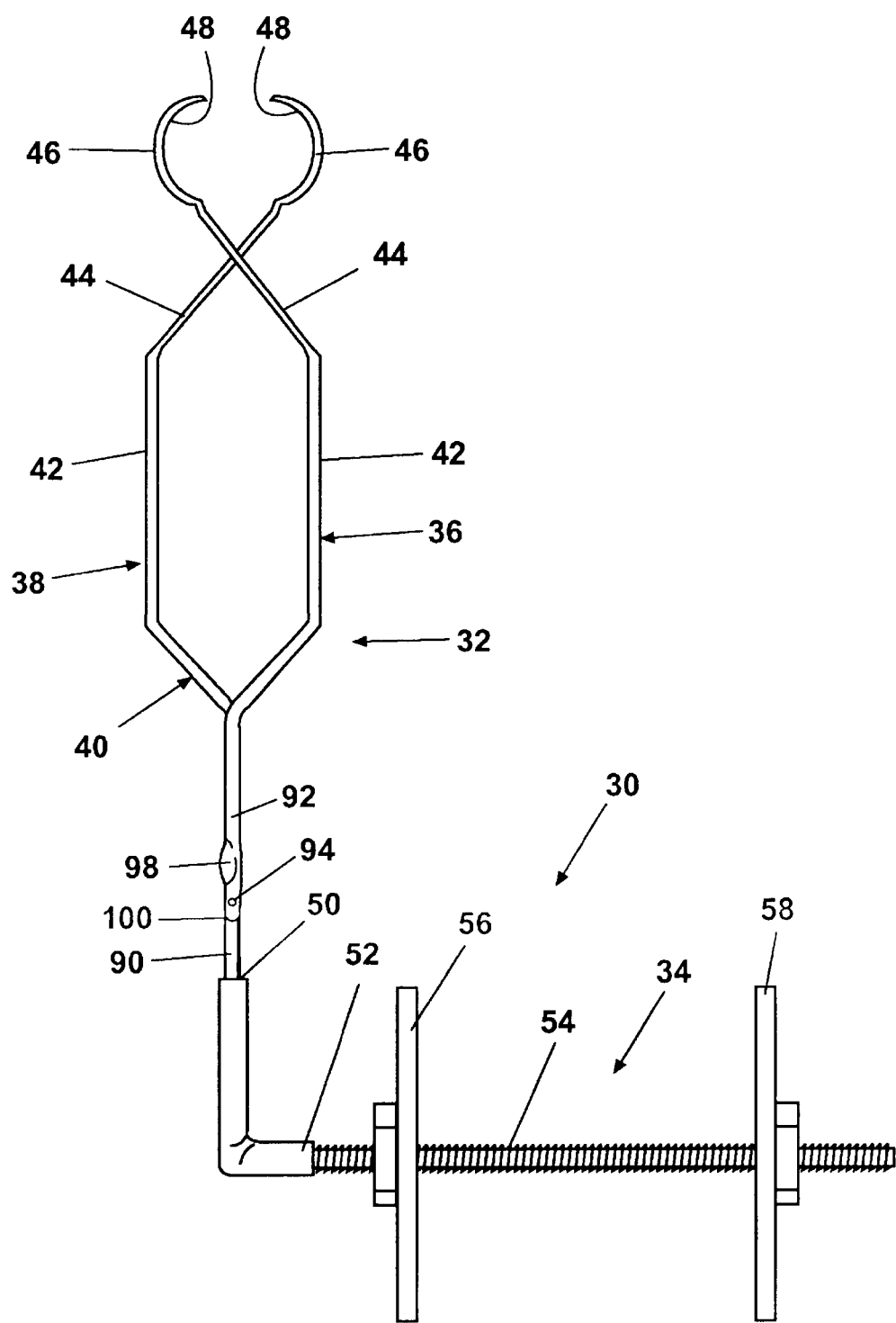
FIG. 6 is a front elevational view of a fourth embodiment of the fishing line feeder spool support of FIG. 1 comprising a pivotable support arm and shown in an unfolded position.
Figure 7:
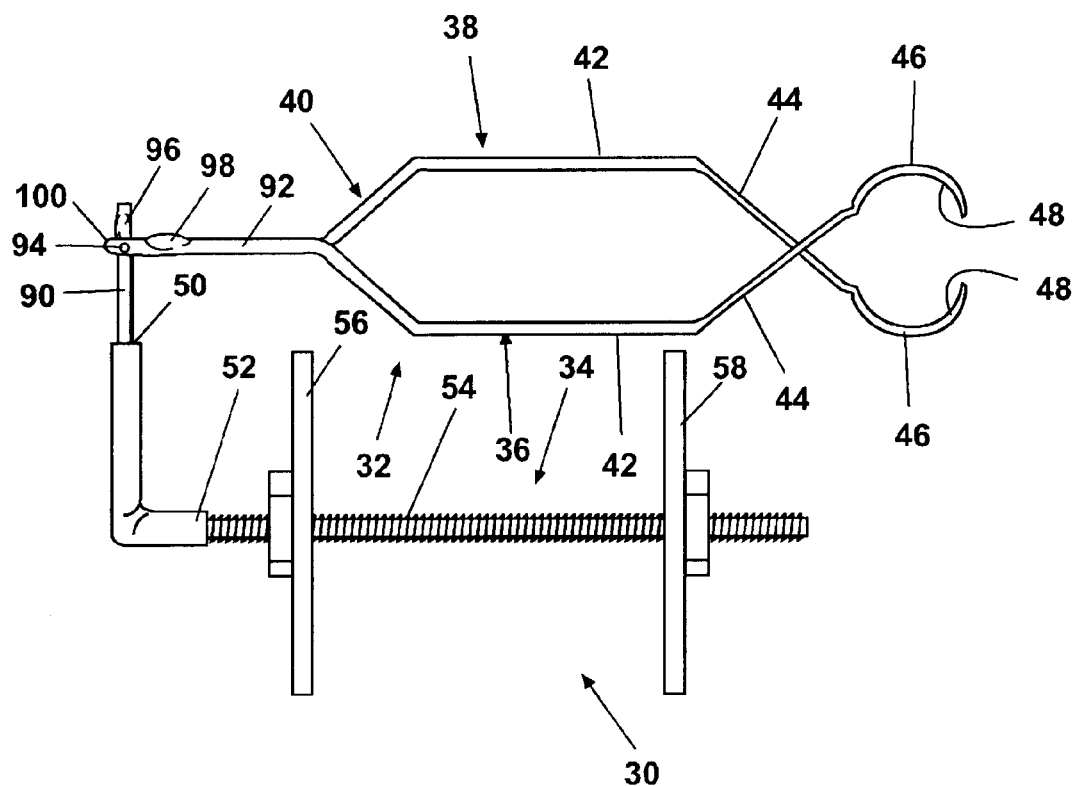
FIG. 7 is a front elevational view of the fishing line feeder spool support of FIG. 7 shown in a folded position.
Figure 8:
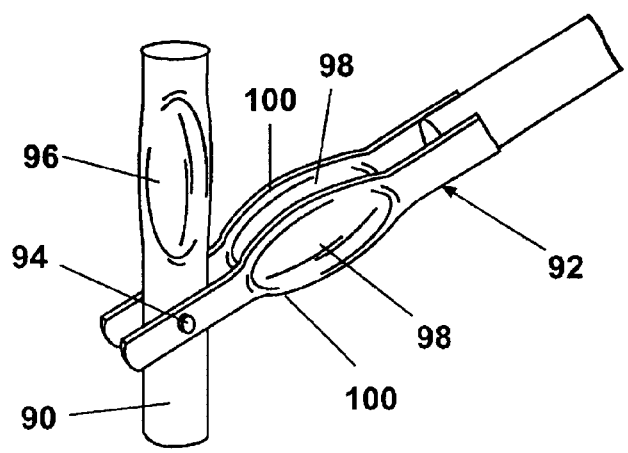
FIG. 8 is a close-up perspective view of the pivotable support arm of FIGS. 6 and 7.

FIGS. 6–8 show a fourth embodiment of the feeder spool support 30 in which the support arm 50 is hinged. The support arm 50 comprises a lower linkage 90 and an upper linkage 92 pivotably joined by a suitable connection, such as a pinned connection 94. As shown in FIG. 8, the upper linkage 92 terminates in a pair of parallel, spaced-apart arms 100 adapted for pivotable insertion of the lower linkage 90 therebetween. The arms 100 are provided with suitable pin apertures adapted for coaxial alignment with a mating aperture in the lower linkage 90 for insertion of a pin therethrough in a well-known manner to form the pivotal connection 94.

Each arm 100 is provided with an inwardly-extending boss 98 in opposed juxtaposition and adapted for operable register with mating detents 96 in the lower linkage 90. The bosses 98 and detents 96 provide an interference fit which will retain the lower linkage 90 in collinear relation to the upper linkage 92, as shown in FIG. 6. The upper linkage 92 can be selectively pivoted relative to the lower linkage 90 as shown in FIG. 7 to fold the quick-release clamp 32 adjacent the spool holder 34 in a compact configuration for storage and transportation. The bosses 98 and the detents 96 can be easily engaged and disengaged for folding and unfolding the quick-release clamp 32 relative to the spool holder 34.

The fishing line feeder spool support 30 is an easily installed device for holding a supply spool of fishing line 18 at a proper orientation for readily loading the line 18 onto a fishing reel 12. The tension on the fishing line 18 as it is loaded onto the reel 12 can be easily adjusted to provide the proper installation of the line 18. The fishing line feeder spool support 30 can be used at home, along a stream, or in a boat for quickly and easily changing fishing line 18 when fishing conditions change. The fishing line feeder spool support 30 eliminates the necessity of relying upon a sporting goods store for installation of fishing line on a fishing reel, or maintaining multiple reel spools of fishing line in order to quickly change fishing line while in the field.

While the invention has been specifically described in connection with certain specific embodiments thereof, it is to be understood that this is by way of illustration and not of limitation. Reasonable variation and modification are possible within the scope of the foregoing disclosure and drawings without departing from the scope of the invention.

What is claimed is:

1. A device for installing a length of fishing line onto a fishing reel mounted onto a fishing rod having a longitudinal axis, comprising:

a spool holder adapted to receive a spool containing the length of fishing line, wherein the spool is mounted for rotatable movement with respect to the spool holder;

a clamp comprising a retainer mounted thereto for movement between a clamped position wherein the retainer is adapted to retain a portion of the fishing rod and a released position wherein the retainer is opened to allow removal of the clamp from the portion of the fishing rod, and a spring wherein the spring biases the retainer to the clamped position; and a support arm connecting the spool holder to the clamp;

whereby, when a user of the fishing rod desires to install the length of fishing line onto the fishing reel, the clamp, in its released position, is positioned over a length of the fishing rod generally distal from the fishing reel, and the clamp is moved to its clamped position so that the clamp is retained on the rod whereby a spool of additional fishing line can be rotatably mounted on the spool holder and the fishing line from the spool can be fed onto the fishing reel in a convenient manner.

2. The device of claim 1 and further comprising a spool retainer for retaining the spool on the spool holder.

3. The device of claim 2 wherein the spool retainer is a flanged nut.

4. The device of claim 3 wherein the flanged nut can be tightened against the spool to restrain the spool against rotating.

5. The device of claim 2 and further comprising a spring inserted between the spool retainer and the spool.

6. The device of claim 1 wherein the support arm is inclined relative to the spool holder.

7. The device of claim 1 wherein the support arm comprises a lower linkage, an upper linkage, and a pivotal connection therebetween for pivotal movement of the upper linkage relative to the lower linkage.

8. The device of claim 1 wherein the clamp, the spool holder, and the support arm lie in a plane orthogonal to the longitudinal axis of the fishing rod.

9. The device of claim 1 wherein the spool further comprises a crank for rotating the spool to retrieve line from the reel onto the spool.

10. The device of claim 1 wherein the spring comprises a helical spring.

11. The device of claim 1 wherein the spring comprises a pair of resiliently conjoined, parallel arms.

12. An assembly for installing fishing line onto a fishing reel comprising:
- a fishing rod having a longitudinal axis;
- a fishing reel mounted to the fishing rod at a first end thereof;
- at least one eyelet adapted to route the fishing line along the length of the rod; and
- a line feeding device comprising
  - a spool holder adapted to receive a spool containing the length of fishing line, wherein the spool is mounted for rotatable movement with respect to the spool holder;
  - a clamp comprising a retainer mounted thereto for movement between a clamped position wherein the retainer is adapted to retain a portion of the fishing rod and a released position wherein the retainer is opened to allow removal of the clamp from the portion of the fishing rod, and a spring wherein the spring biases the retainer to the clamped position; and
  - a support arm connecting the spool holder to the clamp;
- whereby, when a user of the fishing rod desires to install the length of fishing line onto the fishing reel, the clamp, in its released position, is positioned over a length of the fishing rod generally distal from the fishing reel, and the clamp is moved to its clamped position so that the clamp is retained on the rod whereby a spool of additional fishing line can be rotatably mounted on the spool holder and the fishing line from the spool can be fed onto the fishing reel in a convenient manner.

13. The assembly of claim 12 and further comprising a spool retainer for retaining the spool on the spool holder.

14. The assembly of claim 13 wherein the spool retainer is a flanged nut.

15. The assembly of claim 14 wherein the flanged nut can be tightened against the spool to restrain the spool against rotating.

16. The assembly of claim 13 and further comprising a spring inserted between the spool retainer and the spool.

17. The assembly of claim 12 wherein the support arm is inclined relative to the spool holder.

18. The assembly of claim 12 wherein the support arm comprises a lower linkage, an upper linkage, and a pivotal connection therebetween for pivotal movement of the upper linkage relative to the lower linkage.

19. The assembly of claim 12 wherein the clamp, the spool holder, and the support arm lie in a plane orthogonal to the longitudinal axis of the fishing rod.

20. The assembly of claim 12 wherein the spool further comprises a crank for rotating the spool to retrieve line from the reel onto the spool.

21. The assembly of claim 12 wherein the the line feeding device is attached to the fishing rod so that the at least one eyelet is between the fishing reel and the line feeding device.

22. The device of claim 12 wherein the spring comprises a helical spring.

23. The device of claim 22 wherein the spring comprises a pair of resiliently conjoined, parallel arms.

24. A method of installing fishing line from a spool of fishing line onto a fishing reel mounted to a fishing rod comprising the steps of:
- providing a spool holder adapted to receive the spool of replacement fishing line, wherein the spool is mounted for rotatable movement with respect to the spool holder, and the spool holder is removably attached to the fishing rod;
- providing a clamp on the spool holder comprising a retainer mounted thereto for movement between a clamped position wherein the retainer is adapted to retain a portion of the fishing rod and a released position wherein the retainer is opened to allow removal of the clamp from the portion of the fishing rod, and a spring wherein the spring biases the retainer to the clamped position;
- detachably mounting the spool holder to the fishing rod for rotatable movement of the spool with respect thereto in a generally spaced relationship with respect to the fishing reel;
- threading the fishing line from the spool of replacement fishing line to the fishing reel;
- attaching the fishing line to the fishing reel; and
- winding the fishing line onto the fishing reel.

25. The method of claim 24 and further comprising the step of restraining rotation of the spool of replacement fishing line to vary the tension of the fishing line being wound onto the fishing reel.

26. The method of claim 24 and further comprising the step of rotating the spool to unwind fishing line from the fishing reel onto the spool.

* * * * *